Jan. 12, 1971   N. E. VON BEHREN   3,553,867
WORD SELECTING DEVICE AND METHOD
Filed April 4, 1968

INVENTOR.
Nowell E. Von Behren

United States Patent Office 3,553,867
Patented Jan. 12, 1971

3,553,867
WORD SELECTING DEVICE AND METHOD
Norvell E. Von Behren, Pittsford, N.Y., assignor to Vonn & Company, Incorporated, Glendale Heights, Ill., a corporation of Illinois
Filed Apr. 4, 1968, Ser. No. 718,882
Int. Cl. G09f *11/04*
U.S. Cl. 40—70                                                                 7 Claims

ABSTRACT OF THE DISCLOSURE

A naming device is disclosed which comprises a plurality of moveable plates mounted on a frame, with the moveable plates having a plurality of indicia designating male names on one side of the plate and indicia designating female names on the other side of the plates. The frame contains viewing windows through which the name indicia may be viewed in combination.

The device may be adapted for use in naming a baby. Also disclosed is a method for naming a baby.

BACKGROUND OF INVENTION

This invention relates to a naming device generally and more particularly to a baby naming device wherein a large plurality of first and second baby name combinations may be viewed by the person using the device.

The problem of naming children has always been a perplexing one wherein the prospective parents are faced with the frustrating problem of finding a combination of first and second names for their coming child that sounds pleasant and looks right. The problem compounds itself after the first child and again after many successive children, since the new parents always seem to run out of acceptable name combinations for use.

Prior art devices designed to aid the parents in this difficult task usually took the form of books distributed by various commercial companies, said books containing a plurality of male and female names all listed in alphabetical order in a tabular form. Such a book provided some aid to the prospective parents in that it illustrated at a glance, the total number of individual names available; however, it was not possible with the use of such a book to visualize all of the combination of names available without spending lengthy periods of time in the search for a name combination. In using such books the parents would pick a first name that appealed to them from reading the entire list of names. After finally choosing a first name, the parents would then go over the names again to try to fiind a plaeasing second name and, as often happened, when the parents finally selected a second name, that name, more times than not, never seemed to fit with the pre-selected first name, thereby requiring a new selection for the first name and a repetition of the entire process.

SUMMARY OF THE INVENTION

The present invention obviates this problem by providing a baby naming device of the type having the plurality of first and second names circumferentially contained on moveable plates, which may be moved to allow the user to view, through viewing windows, any two names simultaneously and quickly and easily select new combinations of names until an acceptable combination is found.

Accordingly an object of the invention is to provide a new and novel naming device wherein a large plurality of word combinations may be selected and viewed by the user of the device.

Another object of the invention is to provide a new and novel naming device wherein a large plurality of combinations of girls' names are contained on movable plates and an equally large plurality of boys' names are contained on the opposite side of the same moveable plate, thereby allowing the user of the device to view and select an even larger number of combinations of boys' and girls' names.

Still another object of the invention is to provide a new and novel naming device that requires no instructions for operating the device whereby upon viewing the device, having blue indicia on the boys' side and pink indicia on the girls' side, the user is immediately informed of the identity of the boys' and girls' sides without requiring special identifying markings thereby allowing the device to be used without instructions.

Yet another object of the invention is to provide a new and novel naming device of the type wherein the plurality of names contained thereupon are placed there in a random order, the device containing means of selecting predetermined names thereby allowing the user of the device to pre-select any given name.

Another object is to provide a new and novel naming device that may be used in popular games whereby a plurality of word phrases may be randomly selected by the user of the device.

Still another object is to provide a new and novel method for naming baby that allows a name combination to be selected quickly and easily from a large number of possible name combinations.

Yet another object of the invention is to provide a new and novel method for selecting a plurality of word phrases quickly at random from a large number of possible word phrase combinations.

Other objects and advantages of the invention will become apparent from the following description of the drawings taken in conjunction with the description of the preferred embodiment.

DESCRIPTION OF THE PREFERRED EMBODIMENT

Figure 1:
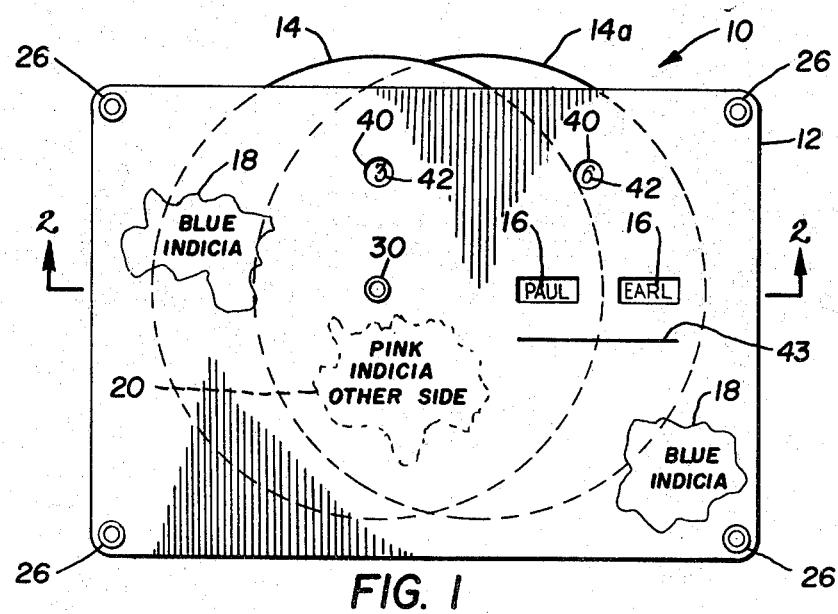
FIG. 1 is an elevational view showing the naming device of the invention.

Referring more particularly to the drawings, there is shown in FIG. 1 the device embodying a preferred form of the invention and comprises the naming device, shown generally as the number 10, and having a frame 12 and a plurality of plates 14 and 14a, movably mounted within the frame 12. The plates 14 and 14a contain indicia 16 designating names printed around the circumference of the plates 14 and 14a, in the manner shown in FIG. 3. The frame 12 also contains indicia 18, designating the color blue, on one side of the frame 12 and indicia 20, designating the color pink, on the other side of frame 12.

Figure 2:
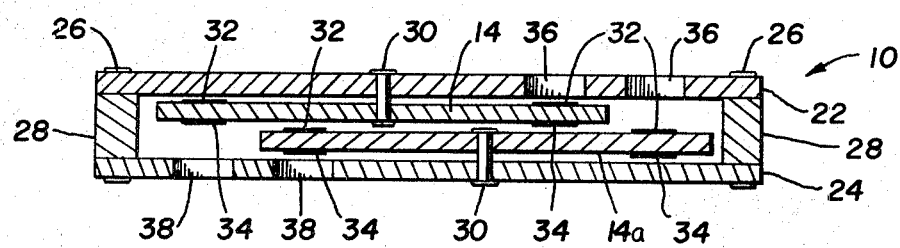
FIG. 2 is a cross-section view taken along line 2—2 of FIG. 1.

Referring in particular to FIG. 2, there is shown a cross-sectional view taken along line 2—2 of FIG. 1 of the naming device 10. The frame 12 may comprise a front frame 22 and a rear frame 24. The front frame 22 and rear frame 24 are held together by eyelets 26 or other well known fastening means. The front and rear frames 22 and 24 are held in a parallel relationship by means of the spacer 28, rigidly attached to the front and rear frames.

The plurality of plates 14 and 14a are moveably mounted to the frames 22 and 24 by means of the axles 30, which may consist of an eyelet or any other mechanical axle structure. The plates 14 and 14a have contained thereon a plurality of name indicia designating male and female names. The plate 14 moveably mounted to the front frame 22 and the plate 14a moveably mounted to the rear frame 24 have contained thereon indicia 32, designating male names, contained on one side thereof and indicia 34, designating female names, contained on the other side thereof.

The front frame 22 contains a plurality of openings 36 through which the indicia designating male names 32 may be viewed. In addition the rear frame 24 contains a plurality of openings 38 through which the indicia designating female names 34 may be viewed.

Figure 3:
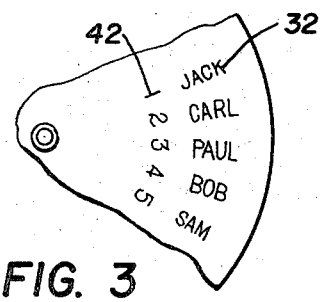
FIGS. 3 and 4 are fragmentary elevational views of the name plates of the naming device showing the male and female indicia and aligning means contained thereon.
Figure 4:
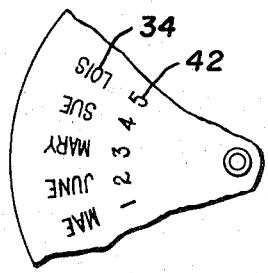

The indicia designating the male and female names may be placed on the plates 14 and 14a in alphabetical order, circumferentially around the plate or they may be placed on the plate in a random, non-alphabetical, order around the circumference of the plates 14 and 14a such as shown in FIGS. 3 and 4. When placed in the random order, it is preferred to have means for finding a given name and aligning a given name in the window when the user desires to place a pre-selected name in one of the viewing windows. Such a means is obtained by the use of a plurality of circular viewing windows 40 positioned on the front and rear frames 22 and 24. In addition the plurality of name plates 14 and 14a have contained thereon indicia 42 designating numbers as shown in FIGS. 3 and 4. The indicia 42 is contained on plates 14 and 14a and is viewed through the viewing windows 40 whenever it is desired to pre-select a given name and view that name in the viewing opening 36 or 38.

In operation, the user of the naming device simply rotates the plates 14 and 14a in any desired direction to allow a plurality of the name combinations to appear in the viewing opening 36 or 38.

If the user has a pre-selected first or second name and wishes to find an appropriate first or second name to go with the pre-selected name, he simply sets the pre-selected name in the viewing window 36 or 38 by rotating the plate 14 or 14a and then rotates the other plate until he finds a pleasing combination of names. When the names are placed on the plates 14 and 14a in alphabetical order, locating a pre-selected name is thereby accomplished. Should the names be placed on the plates 14 and 14a in a random order, then resort should be made to the viewing windows 40 to find a pre-selected name quickly and easily.

In such a case the user may turn to a chart supplied with the device and pick the number corresponding to his pre-selected name and then place that number in the viewing windows 40 after which the user again rotates the other plate to select the combination desired.

The total number of name combinations that are available to the user of this device is dependent upon the total number of names contained on the plates 14 and 14a. The plates 14 and 14a may have the same names and number of names printed on the plates or they may have different names or number of names contained thereon. The total number of combinations of boys' names available will be the total number of boys' name indicia 32 contained on the plate 14 times the total number of boys' name indicia 32 contained on plate 14a. For example, if plate 14 contains 132 boys' names and plate 14a contains an equal number then the total number of name combinations available will be 132×132 or 17,424 name combinations for boys. Assuming the number of girls' name indicia 34 was the same then there would be available on the other side of the device another 17,424 combinations of girls' names. From this it can be seen that a total of 34,848 combinations of male and female names are available to the user, which combination may be selected by means of the moveable plates 14 and 14a thereby allowing the user of the device to quickly and easily name his baby.

The indicia 18, designating blue, is applied to front frame 22 and functions to immediately tell the user of the device that the blue side of the device contains the boys' names without requiring other indicia or instructions to be placed on that side. Conversely the indicia 20, designating pink, contained on the rear frame 24 immediately tells the user of the device that that side contains the girls' names. As a result of this color indicia, instructions necessary for the use of the device are eliminated, it being readily apparent from viewing the blue or pink indicia and the device in general, which names are contained on the side being viewed.

In addition, the front frame 22 and the rear frame 24 may be identical in size, and location of the viewing windows 36 and 38. In addition the indicia 18 and 20 may be identical in design or artwork with only the colors being different. As a result, in the manufacture of the naming device, the same printing plate may be used for the front frame 22 as well as the rear frame 24 with the only changes required being a change in color of printing ink. For example the frame 22 may be run through the printing press once and have printed thereon the blue indicia 18. After the required run of the front frame 22 is completed then the printer simply changes the color of the ink from blue to pink and runs a second quantity of frames through the printing press, thereby producing the rear frame 24 containing the pink indicia 20. Since the frames 22 and 24 are identical then only one cutting die is necessary to cut out the viewing openings 36 and 38 as well as the viewing openings 40. In this manner production costs of the device are greatly reduced, thereby lowering the total cost of the naming device.

Since the same name indicia may be contained on the wheels 14 and 14a, there may be required only one printing for the male name side of the plate 14 and a second printing for the female name side.

Located under the openings 36 and 38 is a line indicia 43 whereon the users of the device may write their last name and view a plurality of full names for their future child.

From the foregoing it becomes apparent that three or more name plates may be used with structural changes in the device, in order to accommodate people desiring more than a first and second name for their child and such a modification is within the spirit and scope of this invention.

From the foregoing, it will be seen that efficient and economical means and method have been provided for accomplishing all the objects and advantages of the invention. Nevertheless, it is apparent that many changes in the details of construction, arrangement of parts or steps in the method may be made without departing from the spirit and scope of the invention as expressed in the accompanying claims and the invention is not to be limited to the exact matters shown and described as only the preferred embodiment has been given by way of illustration.

Having described my invention, I claim:
1. A baby naming device comprising:
  (a) a frame having top and bottom and first and second side edges;
  (b) at least two name plates, rotatably mounted on said frame so that each name plate may be rotated independently of the other name plates;
  (c) indicia, designating baby names, contained on both sides of said name plates; and
  (d) a first set of means, contained on said frame between said rotatable mount and said first side edge, for viewing one side of said name plates, a second set of means contained on said frame between said rotatable mount and said second side edge, for viewing the opposite side of said name plates, said first and second sets of means permitting simultaneous viewing of at least two of said baby names in juxtaposition when said name plates are rotated independently on said frame, said viewing means also serving to block out the remaining baby names on said plates that are not being viewed.

2. The devices as described in claim 1 wherein
(a) said frame comprises;
   (1) a front frame, having mounted thereon one of said name plates and having formed therein at least two of said viewing means;
   (2) a rear frame, having mounted thereon the other of said name plates and having formed therein at least two of said viewing means; and
(b) means, associated with said frames, for connecting said frames together.

3. The device as described in claim 2 wherein
(a) said front frame contains indicia designating the color blue; and
(b) said rear frame contains indicia designating the color pink.

4. The device as described in claim 1 wherein
(a) said frame comprises:
   (1) a front frame having formed therein a pair of front viewing apertures;
   (2) a rear frame having formed therein a pair of rear viewing apertures;
(b) said name plates comprise;
   (1) a first name plate, rotatably mounted on said front frame;
   (2) a second name plate, rotatably mounted on said rear frame;
(c) said baby name indicia comprises;
   (1) first indicia, contained on one side of said first name plate;
   (2) second indicia, contained on the other side of said first name plate;
   (3) third indicia, contained on one side of said second name plate;
   (4) fourth indicia, contained on the other side of said second name plate;
(d) means, associated with said front and rear frames, for connecting said frames together; and
(e) said first, second, third and fourth baby name indicia being arranged on said name plates in such a manner that said first and fourth indicia may be viewed together through said front viewing apertures and said third and second indicia may be viewed together through said rear viewing apertures thereby allowing the user of the device to randomly select first and second baby names by rotating said name plates independently and to view said randomly selected names together as a combination through said viewing means.

5. The device as described in claim 4 wherein said first and fourth indicia are male baby names and said third and second indicia are female baby names.

6. The device as described in claim 5 wherein said front frame contains indicia designating the color blue and said rear frame contains indicia designating the color pink.

7. A method of rapidly selecting a baby's first and second name for both sexes comprising the steps of:
(a) rotating a first name plate, containing a plurality of baby names of one sex on one side and a plurality of baby names of the opposite sex on the other side, to align a desired baby name in a viewing aperture;
(b) independently rotating a second name plate, similar to said first name plate and also containing a plurality of baby names of one sex on one side and of the opposite sex on the other side, to align another desired baby name, in juxtaposition in another viewing aperture;
(c) viewing as a combination, the aligned baby names, in juxtaposition in the viewing apertures;
(d) repeating steps (a) through (c) until a desired combination of baby names of one sex is viewed in juxtaposition in the viewing apertures thereby selecting a baby's first and second name for one sex; and
(e) repeating steps (a) through (d) using the other side of said name plates to view in juxtaposition in the viewing apertures a desired combination of baby names and to select a baby's first and second name of the opposite sex.

References Cited

UNITED STATES PATENTS

| 462,405 | 11/1891 | Hallett | 35—74 |
| 1,253,479 | 1/1918 | Ellithorpe | 40—70 |
| 1,634,194 | 6/1927 | Jacobs | 35—74 |
| 2,425,197 | 8/1947 | Montague | 35—1 |
| 1,046,963 | 12/1912 | Burgquist | 40—70 |

FOREIGN PATENTS

| 1,436,958 | 3/1966 | France | 40—70 |
| 3,628 | 1888 | Great Britain | 35—75 |
| 503,229 | 12/1954 | Italy | 35—35(.8) |

WILLIAM H. GRIEB, Primary Examiner